(12) United States Patent
Qvist et al.

(10) Patent No.: US 12,465,202 B2
(45) Date of Patent: Nov. 11, 2025

(54) ENDOSCOPE COMPRISING A BENDING SECTION HAVING DISPLACED STEERING WIRE LUMENS

(71) Applicant: AMBU A/S, Ballerup (DK)

(72) Inventors: Troels Nicolaj Qvist, Roskilde (DK); Frederik Clausager Vemb Hansen, Copenhagen (DK); Martin Refslund Nielsen, Birkerød (DK)

(73) Assignee: AMBU A/S, Ballerup (DK)

( * ) Notice: Subject to any disclaimer, the term of this patent is extended or adjusted under 35 U.S.C. 154(b) by 401 days.

(21) Appl. No.: 18/112,711

(22) Filed: Feb. 22, 2023

(65) Prior Publication Data

US 2023/0263375 A1   Aug. 24, 2023

(30) Foreign Application Priority Data

Feb. 23, 2022   (EP) .................................... 22158201

(51) Int. Cl.
*A61B 1/005*     (2006.01)
*A61B 1/00*      (2006.01)
(Continued)

(52) U.S. Cl.
CPC ........ *A61B 1/0055* (2013.01); *A61B 1/00045* (2013.01); *A61B 1/00114* (2013.01);
(Continued)

(58) Field of Classification Search
CPC .............. A61B 1/00045; A61B 1/0055; A61B 1/00114; A61B 1/0051; A61B 1/0052;
(Continued)

(56) References Cited

U.S. PATENT DOCUMENTS

| 4,998,916 A | 3/1991 | Hammerslag et al. |
| 5,155,941 A | 10/1992 | Takahashi et al. |

(Continued)

FOREIGN PATENT DOCUMENTS

| EP | 1629764 B1 | 1/2016 |
| EP | 3628208 A1 | 4/2020 |

(Continued)

OTHER PUBLICATIONS

Examination Report issued in EP 22158201.8, dated Aug. 9, 2024, 5 pages.

(Continued)

*Primary Examiner* — Aaron B Fairchild
(74) *Attorney, Agent, or Firm* — Faegre Drinker Biddle & Reath LLP

(57) ABSTRACT

An endoscope including a handle and an insertion cord having a bending section body, a first steering wire portion, and a second steering wire portion. The bending section body includes segments and hinges keeping together, and formed integrally with, the segments, a center axis and a center plane traversing the center axis, the center plane dividing the bending section into a first bending section side and a second bending section side, and the segments including passages that together form a working channel lumen having a non-circular cross-section. Steering wire lumens are displaced with respect to the center plane towards the first side and configured to accommodate the first and second steering wire portions.

19 Claims, 5 Drawing Sheets

(51) Int. Cl.
*A61B 1/008* (2006.01)
*A61B 1/018* (2006.01)

(52) U.S. Cl.
CPC ............ *A61B 1/0056* (2013.01); *A61B 1/008* (2013.01); *A61B 1/018* (2013.01)

(58) Field of Classification Search
CPC ....... A61B 1/0056; A61B 1/008; A61B 1/018; A61B 1/05
See application file for complete search history.

(56) References Cited

U.S. PATENT DOCUMENTS

| | | | |
|---|---|---|---|
| 5,928,136 A * | 7/1999 | Barry | ................... A61B 1/0055 600/142 |
| 5,938,588 A | 8/1999 | Grabover et al. | |
| 6,749,560 B1 | 6/2004 | Konstorum et al. | |
| 8,790,250 B2 | 7/2014 | Petersen et al. | |
| 9,220,400 B2 | 12/2015 | Petersen | |
| 9,968,241 B2 | 5/2018 | Iuel | |
| 10,165,931 B2 | 1/2019 | Petersen et al. | |
| 10,321,804 B2 | 6/2019 | Jacobsen et al. | |
| 10,646,107 B2 | 5/2020 | Matthison-Hansen et al. | |
| 11,357,392 B2 | 6/2022 | Matthison-Hansen et al. | |
| 11,471,031 B2 | 10/2022 | Jensen | |
| 2004/0199052 A1 | 10/2004 | Banik et al. | |
| 2004/0242963 A1* | 12/2004 | Matsumoto | .......... A61B 1/0051 600/176 |
| 2005/0078175 A1* | 4/2005 | Kaneko | .................... A61B 1/05 348/65 |
| 2008/0249483 A1* | 10/2008 | Slenker | ................ A61B 1/0055 600/101 |
| 2009/0234192 A1 | 9/2009 | Okada | |
| 2012/0095369 A1 | 4/2012 | Teixeira et al. | |
| 2013/0041223 A1 | 2/2013 | Kato | |
| 2014/0316194 A1 | 10/2014 | Rapp et al. | |
| 2015/0335227 A1 | 11/2015 | Jacobsen et al. | |
| 2017/0245738 A1* | 8/2017 | Fujitani | ................. A61B 1/008 |
| 2018/0289242 A1 | 10/2018 | Dai | |
| 2018/0296068 A1 | 10/2018 | Matthison-Hansen et al. | |
| 2019/0175007 A1 | 6/2019 | Sørensen et al. | |
| 2019/0175875 A1 | 6/2019 | Mirzalou et al. | |
| 2020/0100648 A1 | 4/2020 | Jensen | |
| 2020/0113412 A1 | 4/2020 | Jensen | |
| 2020/0196835 A1 | 6/2020 | Qvist et al. | |
| 2021/0393113 A1* | 12/2021 | Matthison-Hansen | ..................... A61B 1/0055 |

FOREIGN PATENT DOCUMENTS

| | | |
|---|---|---|
| EP | 3925512 A1 | 12/2021 |
| JP | 2009-279182 A | 12/2009 |
| WO | 2021219811 A1 | 11/2021 |

OTHER PUBLICATIONS

Extended search report in related European Patent Application No. 22158201.8, dated Jul. 19, 2022, 9 pages.

* cited by examiner

ENDOSCOPE COMPRISING A BENDING SECTION HAVING DISPLACED STEERING WIRE LUMENS

CROSS-REFERENCE TO RELATED APPLICATIONS

This application claims priority from and the benefit of European Patent Application No. EP 2215 8201.8, filed Feb. 23, 2022; said application is incorporated by reference herein in its entirety.

TECHNICAL FIELD

The present disclosure relates to an endoscope comprising a bending section body comprising segments connected by hinges. More particularly, the present disclosure pertains to a bending section with a working channel lumen and steering wire lumens.

BACKGROUND

Endoscopes, both reusable and disposable (i.e. single-use), are used for visual examination and diagnosis of hollow organs and body cavities, as well as to assist in surgery, e.g. for a targeted tissue sampling. Endoscopes include procedure-specialized endoscopes, for example arthroscopes, bronchoscopes, cholangioscopes, colonoscopes, cystoscopes, duodenoscopes, gastroscopes, laparoscopes, ureteroscopes, and others. Endoscopes usually comprise a handle, via which an operator/user can hold and control the endoscope, and an insertion cord connected to the handle and comprising an insertion tube, an actively bendable bending section and a distal tip unit. The insertion cord is configured to be inserted into the hollow organs and body cavities of a patient.

Known endoscopes usually contain steering wires that are pulled and released to bend the flexible bending section of the endoscope, in order to tilt the distal tip unit. In order to achieve a bending of the bending section, a rotating force being applied to a handle wheel or a lever provided at the proximal endoscope handle by a user may basically be transmitted into a pulling force acting on the steering wires in an axial direction of the steering wires.

Single-use endoscopes have a bending section with a bending section body molded in one single piece or two single pieces of a polymer material. The bending section body of such a single-use endoscope comprises a number of rigid bending segments kept together by bendable hinges. Between adjacent bending segments of the bending section body two hinge members or hinges may be provided, which are arranged diametrically opposed with respect to a center axis of the bending section body. The hinge members may e.g. be formed as foil hinges, i.e. as short strips or bendable bridges of material between adjacent bending segments allowing the material to bend in an elastic manner between adjacent bending segments.

A user of an endoscope has three main needs or requirements, which an endoscope, in particular an insertion cord of the endoscope, should meet. First, the best possible navigation. Smaller or thinner endoscopes having a small/thin outer diameter of the insertion cord are generally easier to navigate. A user can thus reach further into the respective body cavity of the patient. For example, in the case of a bronchoscope the user can reach deep down into the parts of the lungs, which is preferable for cancer diagnosis. Second, outer compatibility with other devices. Bronchoscopes are often used as guides for endotracheal tubes. Small or thin endoscopes have a larger range of compatibility. Small or thin insertion cords are compatible with both small-size and large-size endotracheal tubes. Third, best possible compatibility with tools and accessories like biopsy forceps, needles, etc., which are guided through the working channel of the endoscope. Larger diameter working channels are compatible with a larger set of tools. Therefore, it is preferable to provide working channels which can accommodate bigger tools, for example tools which are greater than 2 mm in diameter. In sum, it is desirable to have an insertion cord with a small diameter and a large working channel tube.

BRIEF DESCRIPTION OF THE DISCLOSURE

The tasks and objectives of the present disclosure are to eliminate or at least to reduce the disadvantages of the related art. In particular, according to a first aspect, an endoscope shall be provided which is designed for single-use and in which a cross-sectional area of the insertion cord may be reduced and/or a cross-sectional area of a working channel lumen inside the insertion cord may be increased, compared to the related art. Said differently, an endoscope shall be provided in which a relationship between the cross-sectional area of the working channel lumen inside the insertion cord and the cross-sectional area of the entire insertion cord shall be increased compared to the related art.

In the present disclosure, "proximal" means "in a direction away from a patient towards a user", and "distal" means "in a direction towards the patient away from the user".

When a range is disclosed, the expression "in the range of" includes the values that define the range.

In a first embodiment according to the first aspect, an endoscope comprises: a handle; and an insertion cord configured to be inserted into a patient's body cavity and comprising a bendable bending section having a bending section body made from one or two pieces of polymer material; the bending section body comprising: a plurality of bending segments; a plurality of bendable hinges keeping together and formed integrally with the plurality of bending segments; a working channel lumen provided for accommodating a working channel tube; and a first steering wire lumen and a second steering wire lumen, the first steering wire lumen being provided for accommodating a first steering wire and the second steering wire lumen being provided for accommodating a second steering wire, wherein the first steering wire lumen and the second steering wire lumen are displaced with respect to a center plane of the bending section body towards a first side, the center plane being a plane including a center axis of the bending section body and dividing the bending section body in the first side and a second side.

By displacing the steering wire lumens with respect to the center plane such that the steering wire lumens are arranged on the first side with respect to the center plane, there is more space available for the working channel lumen inside the bending section body, in particular when providing a major portion of the working channel lumen on the second side with respect to the center plane, while a sufficient wall thickness between the working channel lumen and the steering wire lumens may still be maintained even for a bending section body having a rather small outer diameter. According to the present disclosure, the working channel lumen can be made larger due to the displacement of the steering wire lumens.

Moreover, the working channel lumen according to the present disclosure preferably, but not necessarily, has a non-circular cross section, which makes it possible to even better use the available space inside the working channel body. Providing the working channel lumen with a non-circular shape allows to increase a maximum possible nominal outer diameter of a working channel tube, which may be arranged inside the working channel lumen. Working channel tubes are usually manufactured in an extrusion process and due to tolerances some working channel tubes may have an outer diameter above the nominal value. By providing a non-circular cross-section it is possible to also easily fit working channel tubes having an outer diameter above the nominal value into the working channel lumen, since there may be provided some extra space into which the working channel tube may be slightly deformed or shaped. Since working channel tubes are usually flexible it is easy to deform or shape working channel tubes from their initial circular shape, so that they adopt a non-circular shape and in particular fill up the extra space provided in the working channel lumen due to its non-circular shape. The advantages of the present disclosure, relating to the provision of an increased working channel lumen inside the insertion cord, in particular inside the bending section body, may also be reached with a working channel lumen having a circular cross-section due to the displacement of the first and second steering wire lumens.

According to the present disclosure, however, the synergy between the displaced steering wire lumens and the non-circular working channel lumen makes it possible to provide and arrange a working channel tube having a larger nominal outer diameter inside the bending section body for a given small outer diameter of the bending section body. The two features in combination thus make it possible to provide an insertion cord with a reduced or small outer diameter and a raised or large cross-sectional area of the working channel lumen. A larger working channel tube can thus be provided inside the bending section body, preferably without compromising an injection molding process of the bending section body and thus a quality of the molded bending section body.

The present disclosure enables an application of a larger nominal outer diameter of the working channel tube, which is arranged inside and runs through the bending section for a specific given outer diameter of the bending section.

The endoscope according to the first aspect is preferably a single-use endoscope. This means that the endoscope is preferably optimized for single use. E.g. the endoscope may be made of a limited number of elements or parts to be assembled, as this will lower the cost of the endoscope assembly. By providing a bending section body made from one or two pieces of polymer material and comprising a plurality of bending segments and a plurality of bendable hinges keeping together and formed integrally with the plurality of bending segments, it is possible to provide a bending section as a part of the endoscope, which has a limited number of elements and which can be assembled easily, and to manufacture the bending section body with a low-cost material (polymer/plastic/resin) in preferably a low-cost manufacturing process (plastic/injection molding). Compared to traditional reusable endoscopes, the endoscopes according to the present disclosure do not have to withstand rather aggressive cleaning processes and general harsh handling over the life cycle of the endoscopes.

Single-use endoscopes optimize workflow and reduce cost while saving patient's lives and improving patient care. They optimize workflow and reduce cost because they are always ready when needed without the traditional large-scale capital and repair budgets required for reusable endoscopes. For example, a sterilization and storage facility is avoided, there is no need to maintain evidence of sterilization, and there is no need to transport endoscopes from sterilization and storage facilities to the buildings where they are needed, sometimes in the middle of the night or weekends. They save patient's lives and improve patient care because they are readily available and do not pose a cross-contamination risk. This also reduces hospital re-admissions. Environmentally, re-useable and single-use endscopes are not very different. While single-use endoscopes are disposed after a single procedure, the environmental impact of re-useable endoscopes is due to cleaning materials, $CO_2$ emissions during the cleaning process, and use of disposable personal protective equipment by personnel involved in transportation and sterilization of the re-useable endoscopes. To further reduce environmental impact, the endoscopes according to the present disclosure are primarily made of polymer materials. Non-polymer materials are used for the steering wires, insertion tube or shaft, and electronics components, such as the camera(s), light emitting diodes, circuit boards and components connected to the circuit boards. Endoscopes with elevator bars may include a metal elevator bar wire. The distal tip part may made, except for the electronic components and wires, exclusively of polymer materials. Metal adapter rings, metal screws, and other non-polymeric components may thus be excluded from the distal tip part.

The endoscope according to the first aspect is preferably a small (outer) diameter endoscope. In particular, an outer diameter of the insertion cord may be below 6 mm, preferably below 5 mm, further preferably below 4 mm and especially preferred below 3 mm. Therefore, the endoscope according to the present disclosure advantageously provides good navigation and good compatibility with other devices used together with the endoscope. The endoscope may e.g. be a bronchoscope, an ureteroscope or a cholangioscope, since small outer diameters are especially advantageous for these types of endoscopes. However, the present disclosure is not limited to the endoscope being a bronchoscope, an ureteroscope or a cholangioscope and the provision of a small outer diameter may be advantageous or desired for all kinds of endoscopes, i.e. also for arthroscopes, colonoscopes, laparoscopes, gastroscopes, duodenoscopes, etc.

The endoscope according to the present disclosure is preferably a two-way bending endoscope. I.e. the endoscope may preferably be bent in only one bending plane, i.e. in two opposite bending directions (e.g. up and down, or left and right). In case the endoscope is a two-way bending endoscope, it is preferred to provide exactly two steering wire lumens in the bending section body. However, it is also conceivable that the endoscope is a four-way bending endoscope.

The endoscope preferably comprises at least a first steering/control/pull wire. The first steering wire may comprise an intermediate portion thus provide two steering wire portions extending from the intermediate portion to the handle. A second steering/control/pull wire, independent of the first, may be provided if the intermediate portion is omitted, thus providing a second steering wire portion independent or separate from the first. The first steering wire portion is arranged in the first steering wire lumen and the second steering wire portion is arranged in the second steering wire lumen. A rotating force may be applied to an operating unit like a handle wheel or a lever at the proximal endoscope handle by a user, which is transmitted into a pulling force acting on the first and second steering wire portions in an axial direction. Preferably, the first steering wire portion and the second steering wire portion are displaced with respect to the center plane when they run through the bending section body.

The articulated bending section body comprised in the endoscope according to the present disclosure is preferably an elongated bendable tubular member and has an essentially cylindrical shape in an unbent state of the elongated bendable tubular member. The bending section body is preferably molded, in particular injection molded, from one or two pieces of polymer/plastic/resin material. The polymer material is preferably a thermoplastic polymer material. According to an especially preferred embodiment, the bending section body is made from only one single piece of polymer material. By using appropriate molds and cores it is possible for a skilled person to manufacture a tubular bending section body having a plurality of bending segments and a plurality of bendable hinges keeping together and formed integrally with the plurality of bending segments, and having a plurality of inner lumens in one single piece of polymer material in an injection molding process.

The bending segments of the bending section body preferably comprise a proximal end segment, which is the proximal-most bending segment of the plurality of bending segments, a plurality of intermediate segments and a distal end segment, which is the distal-most bending segment of the plurality of bending segments. The proximal end segment is preferably adapted to be connected to an insertion tube of the insertion cord. The distal end segment is preferably adapted to be connected to a distal tip unit of the insertion cord. The bending segments may be described as having a hollow cylindrical or annular shape with inner lumens/passages. The intermediate segments may be identical to each other. The plurality of segments comprise at least three bending segments. The number of bending segments may be varied depending on the purpose or the dimensions of the endoscope, i.e. the type of procedure the endoscope is designed for.

Preferably, a pair of hinges or members, namely a first hinge and a second hinge, is provided between two adjacent bending segments of the plurality of bending segments. The first hinge is preferably arranged diametrically opposed to the second hinge with respect to the center axis of the bending section body, i.e. the first hinge and the second hinge are preferably spaced by 180° in a circumferential direction of the bending segments. The first hinge and the second hinge are preferably formed as foil hinges, i.e. as short bendable bridges of material between adjacent bending segments, allowing the material to bend in an elastic manner between adjacent bending segments. In case of a two-way bending endoscope, the plurality of first hinges between the plurality of bending segments are preferably axially aligned and the plurality of second hinges between the plurality of bending segments are preferably also axially aligned. More than two hinges may be provided (a first hinge, a second hinge, a third hinge, etc.) between adjacent bending segments in some embodiments.

The first steering wire lumen and the second steering wire lumen being displaced or offset with respect to a center plane of the bending section body preferably means that a first axis of the first steering wire lumen and a second axis of the second steering wire lumen which is parallel to the first axis define a plane which may be designated as steering wire passage plane and said steering wire passage plane is displaced or offset from the center plane which is a plane parallel to the steering wire passage plane and which includes the center axis of the bending section body. The first steering wire lumen and the second steering wire lumen preferably have a cross-sectional shape in the form of a circle or circle segment, i.e. a circular or partially circular cross-sectional shape, and the first axis and the second axis preferably go through/are defined by a circle center of the circle or circle segment.

In other words, preferably a plane passing both through the center of the first steering wire lumen and through the center of the second steering wire lumen and thus being defined by the first steering wire lumen and the second steering wire lumen is displaced in relation to a parallel center plane passing through the center axis of the bending section body and thus does not comprise the center axis of the bending section body.

Said again in other words, the first steering wire lumen and the second steering wire lumen are preferably displaced/offset from the center plane that includes the center axis of the bending section body in the same direction and by at least approximately the same offset or distance so that the first steering wire lumen and the second steering wire lumen are preferably not arranged diametrically opposed to each other with respect to the center axis of the bending section body and so that the first steering wire lumen and the second steering wire lumen are both arranged on the first side of the bending section body.

There is thus preferably formed a distance or offset/displacement between the steering wire passage plane and the center plane. The distance or offset is preferably set such that the working channel lumen which is preferably a central passage or lumen provided for accommodating the working channel tube may be enlarged so that a working channel tube having a larger diameter may be fitted into the working channel lumen while at the same time a bending behavior or bending capability of the bending section body is not affected. This is especially of advantage for small outer diameter endoscopes having the bending section body according to the present disclosure since it is made possible that the working channel lumen may be enlarged while at the same time a sufficient wall thickness between the working channel lumen and the first and second steering wire lumens may be maintained.

The offset or displacement of the steering wire passage plane from the center plane, i.e. the distance between the steering wire passage plane and the center plane is preferably greater than (or equal to) 0.2 mm, preferably greater than 0.3 mm. It is to be understood that the distance may also be much higher than 0.3 mm. The distance may be (substantially) 0.2 mm. In case the distance between the steering wire passage plane and the center plane is d and the outer diameter of the bending section body (seen in the cross-section) is D, it may apply that d/D is greater than 4%, preferably greater than 6%. The distance d should be set such that a sufficient wall or material thickness between the first and second steering wire lumens and an outer cylindrical surface of the bending section body can be maintained. Any of the provided lumens inside the bending section body preferably has a wall or material thickness of at least 0.2 mm to any other provided lumen inside the bending section body and also to the outer cylindrical surface of the bending section body. Said differently, in case there are walls in the bending section body which have a thickness of less than 0.2 mm manufacturing the bending section body via injection molding will be complicated.

Displacing the first and second steering wire lumens leads to the first and second steering wire lumens being arranged closer to the first hinges than to the second hinges. In particular, the center plane with respect to which the first and second steering wire lumens are displaced is preferably a plane, which is perpendicular to a plane, which is defined by the first and second hinges and the central axis of the bending section body. The displacement of the first and second steering wire lumens may thus lead to uneven bending, in particular in case the displacement is rather high. In this light, it may be preferable according to the present disclosure to provide uneven hinges, i.e. to form the first hinges differently compared to the second hinges. E.g., the first hinges may be made stronger or more robust compared to the second hinges, i.e. a stiffness of the first hinges, which are closer to the steering wire lumens than the second hinges, may be greater than a stiffness of the second hinges. In case the first and second hinges are formed as foil hinges, i.e. bridges of material, the stiffness of the first and second hinges can be suitably set by varying a cross-section of the hinges or by varying a length of the hinges. An increased cross-section of the first hinges compared to the second hinges or a decreased length of the first hinges compared to the second hinges makes the first hinges stiffer and thus stronger and more robust. To form the first hinges differently from the second hinges may avoid uneven bending, which is a direct consequence of the displacement of the steering wire lumens. However, it has been shown via experiments that a relatively small displacement, which is preferably the case according to the present disclosure, does not compromise the bending performance of the bending section. Therefore, according to an especially preferred embodiment, the first hinges and the second hinges are formed identically and thus do not differ in their stiffness. Therefore, according to an especially preferred embodiment, the first hinges and the second hinges are formed identically and thus do not differ in their stiffness. In one variation, all the first hinges and the second hinges are identical. In another variation, pairs of hinges comprising the first and second hinges connecting adjacent segments are identical, but pairs of hinges disposed along the length of the bending section are not necessarily identical to other pairs. For example, distal pairs of hinges might be more flexible than proximal pairs of hinges, to impart better bendability on the bending section at its distal end.

The working channel lumen as the central passage or lumen of the working channel body is preferably a lumen comprising the center axis of the bending section body, so that the available space inside the bending section body is appropriately used.

Preferably, a working channel tube as an elongated bendable or flexible tubular member is provided in the working channel lumen and a cross section of the working channel tube is circular. There is thus preferably provided a working channel tube having a circular cross-section in the working channel lumen having a non-circular cross-section.

According to a preferred embodiment, the non-circular cross-section of the working channel lumen has a shape of a widened or bulged circle. E.g., a plurality of bulges or bulge portions, in particular two, three or four bulge portions, may be provided, in which the cross-section is widened or extended compared to a perfect circular circle. This advantageously makes it possible to deform or shape the working channel tube (having a circular cross-section prior to assembly) into the working channel lumen even if the working channel tube has an outer diameter above the nominal value. In other words, even if the working channel tube is a little bit too large/has a too large outer diameter caused by tolerances in the production, the working channel tube can be pressed into the working channel lumen and the flexible and elastic working channel tube may fill the bulge portions of the non-circular cross-section of the working channel lumen. Such a working channel tube may be used even if its diameter is larger than a nominal value. In one variation, the working channel tube is manufactured with a non-circular cross-section, for example by extrusion with an extrusion die having a non-circular cross-section. Such a working channel tube may increase the available cross-section space after assembly relative to a working channel tube that has a circular cross-section before it is inserted into the bending section.

Preferably, the non-circular cross-section of the working channel lumen has an axisymmetric shape, i.e. has preferably at least one axis of symmetry. Especially preferred the axis of symmetry is perpendicular to the center plane of the bending section body. Often, the axis of symmetry may be parallel to or coincident with a plane formed by the hinges.

According to an especially preferred embodiment, the non-circular cross-section of the working channel lumen has a cross-sectional shape of a trapezoid/trapezium with rounded corners, preferably of an isosceles trapezoid with rounded corners. The corners of the trapezoid are thus preferably cut out such that no perfect circle is formed. Assuming that the central plane divides the bending section body into the first side and the second side and that the first and second steering wire lumens are provided on the first side with respect to the center plane, it is preferable to arrange the short base or base side which is the short side of the two parallel sides of the trapezoid on the first side with respect to the center plane and to arrange the long base or base side which is the long side of the two parallel sides of the trapezoid on the second side with respect to the center plane. The legs of the trapezoid are preferably arranged such that an isosceles trapezoid is formed, i.e. an angle between a first leg and the short base is preferably identical to an angle between a second leg and the short base, and an angle between the first leg and the long base is preferably identical to an angle between the second leg and the long base. Thus, the portion of the non-circular cross-section of the working channel lumen located in the second side is bulged, meaning that the radius of the cross-section of the working channel lumen in the second side is not constant. The portion of the non-circular cross-section of the working channel lumen located in the second side may be larger than the portion lying in the first part, when the periphery is closed and the working channel lumen receives only the working channel tube. In one variation, the radius of the cross-section of the working channel lumen in the second side is shortest when parallel to the bending plane and increases as the radius moves away from parallel, potentially equally in both directions. In one example, the portion of the cross-section of the working channel lumen in the second side comprises two lateral bulges.

According to a preferred embodiment, the non-circular cross-section of the working channel lumen has a center of mass/a center/a point of balance, and the plane defined by the first and second steering wire lumens lies on the first side with respect to the center plane and the center of mass lies on the second side with respect to the center plane. Said differently, it is preferred if a greater/major portion of the working channel lumen lies on the second side with respect to the center plane and a smaller/lower portion of the working channel lumen lies on a the first side with respect to the center plane.

The bending section body preferably further comprises an electrical wire passage or lumen, which can also be designated as electrical cable lumen. The electrical wire passage preferably accommodates electrical supply wires or electrical cables like cables for the camera or for light emitting diodes provided in the distal tip unit. The electrical wire passage is preferably accommodated on the same side with respect to the center plane on which the first and second steering wire lumens are provided, i.e. on the first side. The electrical wire passage may have an axisymmetric cross-section. An axis of symmetry of the cross-section of the electrical wire passage may be perpendicular to the center plane. The cross-section of the electrical wire passage may have an elongated, rounded, approximately trapezoidal shape with rounded corners, especially preferred like an isosceles trapezium.

According to a preferred embodiment, the working channel lumen is a circumferentially closed lumen, i.e. a passage or lumen which is not connected to the electrical wire passage and/or to the first steering wire lumen and/or to the second steering wire lumen. Preferably, also the first and second steering wire lumens are each circumferentially closed lumens. Further, also the electrical wire passage is preferably a circumferentially closed lumen. There is thus preferably provided a wall of polymer material between the working channel lumen and the first steering wire lumen and between the working channel lumen and the second steering wire lumen. Especially preferred, there is also a wall of polymer material between the working channel lumen and the electrical wire lumen. In case there is a wall of polymer material between any of the provided lumens, i.e. the working channel lumen, the first and second steering wire lumens and the electrical wire lumen, a wall thickness of polymer material is preferably greater than 0.2 mm, in order to be able to suitably manufacture the bending section body via injection molding. It is to be understood that the term "(circumferentially) closed lumen" particularly relates to a situation within each bending segment of the bending section body. There may of course be open space axially between adjacent bending segments, however the respective tubes and wires are preferably kept in place by the circumferentially closed lumens provided within the bending segments of the bending section body. Said differently, each of the circumferentially closed lumens receives one functional type of component, whether a tube, a steering wire, or electrical wires, whereas two circumferentially open lumens connected to each other form a circumferentially closed lumen that receives two or more functional types of components, such as a tube and electrical wires or a tube and steering wires or a tube and electrical wires and steering wires.

Therefore, alternatively, the working channel lumen or passage may also be a circumferentially open lumen, i.e. a passage or lumen, which is connected to the electrical wire lumen and/or to the first or second steering wire lumens. According to said alternative embodiment, the working channel tube inserted and arranged in the working channel lumen may replace or substitute a wall of polymer material limiting the electrical wire lumen and/or the first or second steering wire lumens. E.g., the electrical wire lumen may be formed partially by the polymer material of the bending section body and partially by the working channel tube. The same applies preferably for the first and second steering wire lumens.

Further, a core used for forming the working channel lumen in an injection molding process may have a slight cone shape in order to be better able to remove the core again after the injection molding process. Therefore, a cross-sectional area of the working channel lumen at the proximal end segment of the bending section body may be a little bit smaller than a cross-sectional area of the working channel lumen at the distal end segment of the bending section body (or the other way round). The cross-section of the working channel lumen of the bending section body may thus slightly increase along the bending section body from the proximal end segment to the distal end segment. In this case, it may be provided that the displacement of the steering wire lumens with respect to the center plane also slightly increases along the bending section body from the proximal end segment to the distal end segment. I.e. it may be provided that the displacement of the steering wire lumens in the distal end segment of the bending section body is greater than the displacement of the steering wire lumens in the proximal end segment of the bending section body. It may also be provided that the displacement is only provided in distal segments of the bending section body, e.g. segments located distally of a longitudinal center of the bending section.

BRIEF DESCRIPTION OF THE FIGURES

The disclosure is explained in more detail below using preferred embodiments and referring to the accompanying figures.

The figures are schematic in nature and serve only to understand the disclosure. The features of the different embodiments can be interchanged among each other.

DETAILED DESCRIPTION

Figure 1:
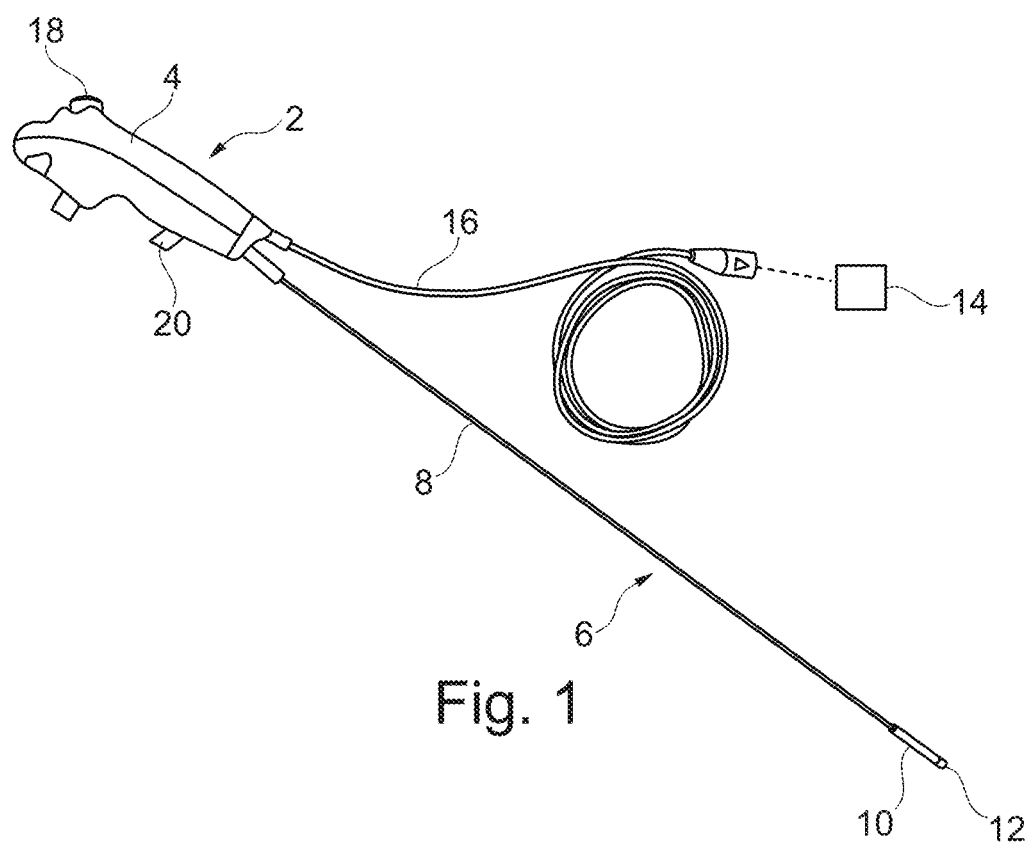
FIG. 1 is a perspective view showing an endoscope according to the present disclosure.

In FIG. 1, an endoscope 2 is shown. The endoscope 2 is preferably a single-use endoscope. The endoscope 2 is preferably, but not necessarily, a small-diameter endoscope such as an ureteroscope or a bronchoscope. The endoscope 2 comprises a handle 4 designed to be held by a user/physician and being configured to accommodate operating parts of the endoscope 2. Further, the endoscope 2 comprises an insertion cord 6, which is configured to be inserted into a patient's body cavity. The insertion cord 6 comprises an insertion tube 8, a bending section 10 and a distal tip unit 12, extending in this order from the proximal handle 4.

At the distal tip unit 12, image capturing means such as a miniature video camera and illuminating means, such as light-emitting diodes or optical fibers connected to a proximal source of light, are arranged/installed, such that the patient's body cavity can be illuminated and inspected. An image captured by the image capturing means can be shown on a monitor 14. The monitor 14 is provided separately from and connected/connectable with the endoscope 2 via a cable 16 or wirelessly. Thus, the endoscope and the monitor may comprise wireless transceivers to exchange image data and configuration data for the image sensor. The endoscope may comprise a battery to power the image sensor and the LEDs.

The handle 4 comprises an operating unit 18, which is preferably formed as a lever, for steering the bending section 10 of the insertion cord 6. E.g., a rotation/turning force can be applied to the operating unit 18 by the user. The distal tip unit 12 may be tilted/moved by bending the bending section 10. In particular, the operating unit 18 can be operated by the user to tilt the distal tip unit 12 in a bending plane (e.g. up-down). The bending section body 22 (shown in FIG. 2) may be largely covered by a flexible cover (not shown) for preventing contamination.

A positioning interface, or interface, functions to control the position of the insertion cord 6. The handle 4 is an example of a positioning interface and, unless stated otherwise, the terms are used interchangeably. The positioning interface also functions to provide the steering controls, e.g. knobs, levers, buttons, and the like, to steer the field of view of the camera and elevator controls. Alternatively, a different positioning interface can be provided that is connected to the insertion cord and is detachably connected to a robotic arm. The insertion cord thus extends, and is detachable, from the robotic arm. The robotic arm responds to signals, including voice commands from an operator, to rotate, translate, and otherwise position the proximal end of the insertion cord, as an operator would do manually. The positioning interface can include control actuators, including manual control actuators. Alternatively or additionally, control actuators can be provided in or on the robotic arm or by the robotic system including the robotic arm, thereby potentially reducing the cost of the insertion cord and/or endoscope. Example control actuators include single axis actuators, including linear motion actuators. A linear motion actuator may comprise a threaded rod coupled to a threaded nut portion, in which a motor rotates the rod to translate the nut portion.

The endoscope 2 may comprise steering wires (shown in FIG. 6) for controlling the bending movement of the bending section 10. The steering wires may be connected to the operating unit 18. The steering wires may extend through the insertion tube 8 and the bending section 10. By rotating the operating unit 18, steering wires/steering wire portions can be pulled and released and the distal tip unit 12 can tilt according to a direction in which the operating unit 18 is rotated. In other words, by operating the operating unit 18 the user is able to tilt the distal tip unit 12 in the bending plane by bending the bending section 10 correspondingly.

Although FIG. 1 shows a one-plane bending endoscope, the present disclosure is not limited to the endoscope 2 being a one-plane bending endoscope. I.e. the endoscope 2 may also be a two-plane bending endoscope configured for bending in a first bending plane and a second bending plane, wherein the second bending plane is preferably perpendicular to the first bending plane.

The endoscope 2 further comprises a working channel which extends from a working channel access port 20 provided at the handle 4 to the distal tip unit 12. The working channel is a lumen comprised by a working channel tube, which extends through the handle 4, the insertion tube 8 and the bending section 10. The working channel tube may comprise multiple sections joined together.

Figure 2:
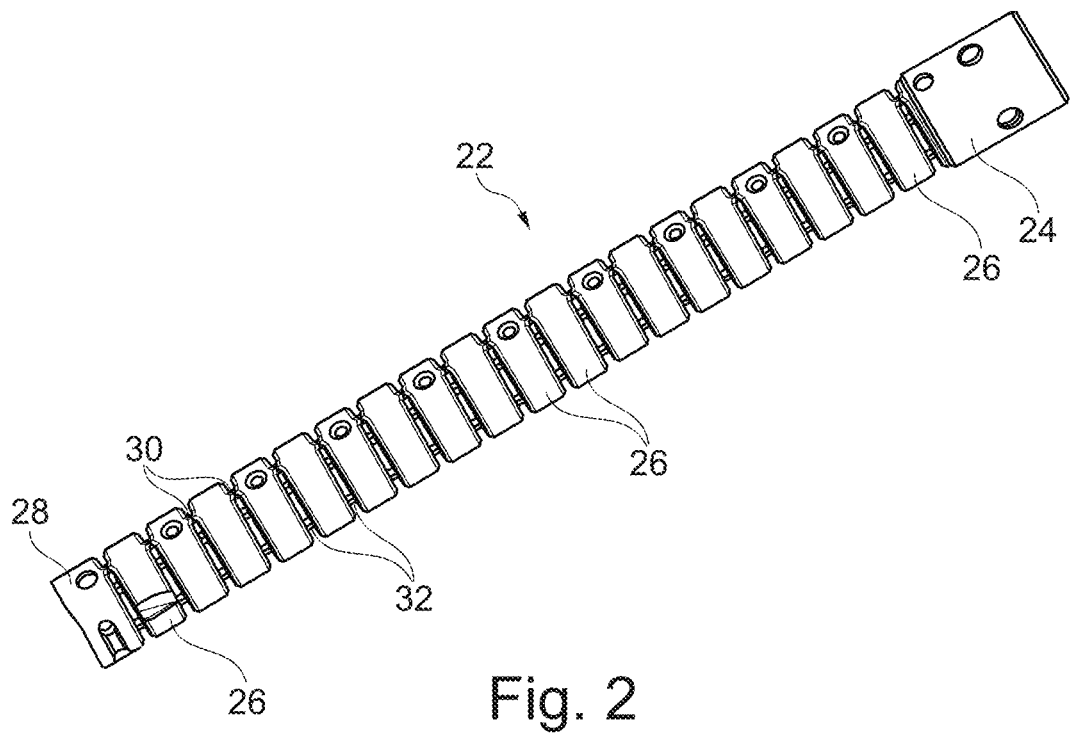
FIG. 2 is a perspective view showing a bending section body of the endoscope.

The bending section 10 of the insertion cord 6 comprises the bending section body 22, which is illustrated in FIG. 2 in a perspective view. The bending section body 22 is an elongated tubular member and—in an unbent state as shown in FIG. 2—may have a cylindrical shape. The bending section body 22 is an integral part formed from one single piece of thermoplastic polymer material, for example polyoxymethylene (POM), and manufactured in an injection molding process. The bending section body 22 may also be formed of two pieces of polymer material (and thus not only of one piece).

The bending section body 22 comprises a plurality of bending segments, namely a proximal end segment 24, a plurality of intermediate segments 26 (nineteen in FIG. 2) and a distal end segment 28. The proximal end segment 24 is the proximal-most bending segment of the plurality of bending segments and is adapted to be connected to the insertion tube 8 of the insertion cord 6. The distal end segment 28 is the distal-most bending segment of the plurality of bending segments and is adapted to be connected to the distal tip unit 12 of the insertion cord 6. The plurality of intermediate segments 26 is arranged between the proximal end segment 24 and the distal end segment 28.

Bendable hinges are provided between any adjacent bending segments. The bendable hinges keep together the plurality of bending segments and are formed integrally with the plurality of bending segments. In particular, between two adjacent bending segments of the plurality of bending segments a pair of hinges, namely a first hinge 30 and a second hinge 32, is provided. The first hinges 30 are preferably arranged diametrically opposed to the second hinges 32 with respect to the center axis of the bending section body 22, i.e. the first hinges 30 and the second hinges 32 are preferably spaced by 180° in a circumferential direction of the bending segments. The first hinges 30 and the second hinges 32 are formed as foil hinges, i.e. as short bendable bridges of material between adjacent bending segments, allowing the material to bend in an elastic manner between adjacent bending segments. As can be seen in FIG. 2, the plurality of first hinges 30 between the plurality of bending segments is axially aligned, i.e. the first hinges 30 are arranged along a common straight line. The plurality of second hinges 32 between the plurality of bending segments is also axially aligned so that the second hinges 32 are also arranged along a common straight line.

Figure 3:
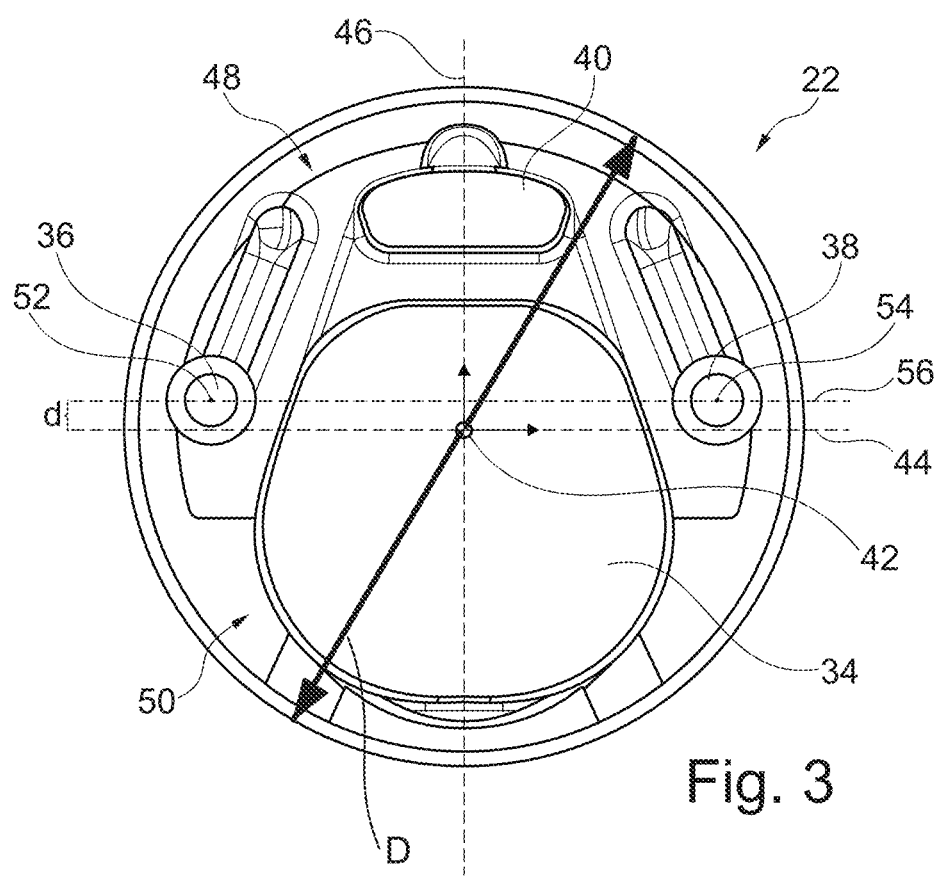
FIG. 3 is a cross-sectional view of the bending section body according to a first embodiment.

FIG. 3 is a cross-sectional view of the bending section body 22, in particular through a bending segment of the bending section body 22, e.g. the distal end segment 28, according to a first embodiment. As can be seen in FIG. 3, the bending section body 22 comprises a plurality of inner lumens or passages, namely a working channel lumen 34, a first steering wire lumen 36, a second steering wire lumen 38 and an electrical wire lumen 40. The electrical wire lumen 40 may receive an electrical supply wire, for example, and other wires conducting electrical signals.

In FIG. 3, a center axis 42 which is a central cylinder axis of the bending section body 22 and which runs through a center point or circle center of the cross-sectional area of the bending section body 22 is shown. FIG. 3 further shows two planes, which include the center axis 42, namely a center plane 44 and a hinge plane 46. The hinge plane 46 is defined by the center axis 42 and the first and second hinges 30, 32, in particular a center of the first and second hinges 30, 32. The center plane 44 is a plane, which is perpendicular to the hinge plane 46. The center plane 44 divides the bending section body 22 in a first side 48, in FIG. 3 above the center plane 44, and a second side 50, in FIG. 3 below the center plane 44.

As can be further seen in FIG. 3, the first steering wire lumen 36 and the second steering wire lumen 38 are displaced with respect to the center plane 44 by a displacement or distance d. In particular, as shown in FIG. 3, a first axis 52 of the first steering wire lumen 36 and a parallel second axis 54 of the second steering wire lumen 38 define a steering wire passage plane 56. The steering wire passage plane 56 is parallel to the center plane 44 and distanced from the center plane by the displacement or distance d. The first steering wire lumen 36 and the second steering wire lumen 38 are thus not arranged diametrically opposed to each other with respect to the center axis 42 of the bending section body 22. Instead, the first steering wire lumen 36 and the second steering wire lumen 38, in particular their axes, i.e. the first axis 52 and the second axis 54, are both arranged on the first side 48 of the bending section body 22, on radial outer areas, with a relatively small displacement or distance d to the center plane 44 so that the bending performance of the bending section body 22 is not compromised due to an excessive displacement of the steering wire lumens 36, 38. A relative small displacement is e.g. a displacement d of around 0.2 mm to 0.5 mm, in a bending section body 22 having an outer diameter of 2.5 mm to 6.0 mm. An average diameter of the bending section body may be in the range of 2.5 mm to 6.0 mm, and the distance d may be greater than or equal to 4%, greater than 6%, and even greater than 8% of the average diameter. In one variation of the present embodiment, the average outer diameter of the bending section tube is about 1.5 mm, preferably 1.5+/−0.1 mm, and the average outer diameter of the bending section body is about 3.0 mm, preferably 3.0+/−0.2 mm. In another variation of the present embodiment, the average outer diameter of the bending section tube is about 2.5 mm, preferably 2.5+/−0.1 mm, and the average outer diameter of the bending section body is about 4.4 mm, preferably 4.4+/−0.2 mm. In the present context the term "about" comprises 5% of the stated value.

The bending section body may have a circular cross-section, in which case the average diameter D is the diameter of the circular cross-section and the center axis is a center point or circle center of the cross-sectional area of the bending section body. The bending section body may have a non-circular cross-section, in which case the average diameter is the average of various diameters, e.g major and minor diameters in the case of an oval shape, and the center axis is a center point or cross-sectional area center of the bending section body, which is at the cross-section of the major and minor diameters in the case of an oval shape.

Figure 4:
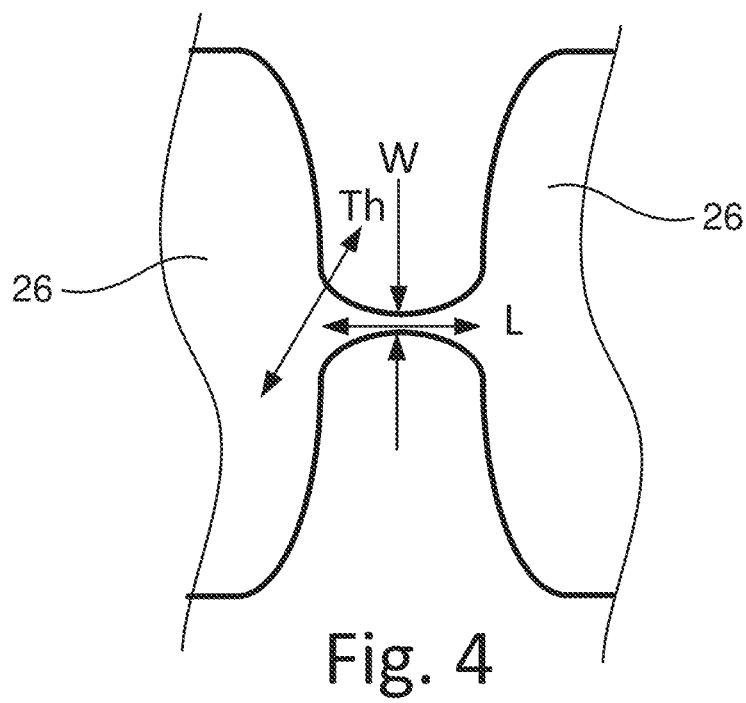
FIG. 4 is a partial side view of adjacent segments of the bending section body according to embodiments of the disclosure.

To avoid that the bending performance of the bending section body 22 is compromised due to the displacement of the steering wire lumens 36, 38, it may also be provided with reference also to FIG. 2 to make the first hinges 30, which are arranged on the first side 48, stronger, e.g. stiffer, compared to the second hinges 32, which are arranged on the second side 50. The hinges, an example of which is shown in FIG. 4, are polymer strips extending between adjacent segments. Each hinge has a length L, a width W, and a thickness Th. The length is the distance between segments and the thickness is the distance transverse to the length of the bending section body. In one example, the first and second hinges have different widths, the first hinges having larger widths. A larger width increases stiffness. In another example, the first and second hinges have different lengths, the second hinges having longer lengths. A longer hinge is less stiff. The length of the segment on the side where the longer hinge is placed will be smaller than the length of the segment on the opposite side, where the shorter hinge is placed. The length and width can be varied to obtain stiffer hinges, resulting in the first hinges being stiffer than the second hinges. A thickness increase also increases stiffness. Since the L, W, and Th parameters are relative between opposing hinges, it does not matter how they are measured as long as they are measured in the same manner. The first and second hinges may be made of the same material.

Figure 5:
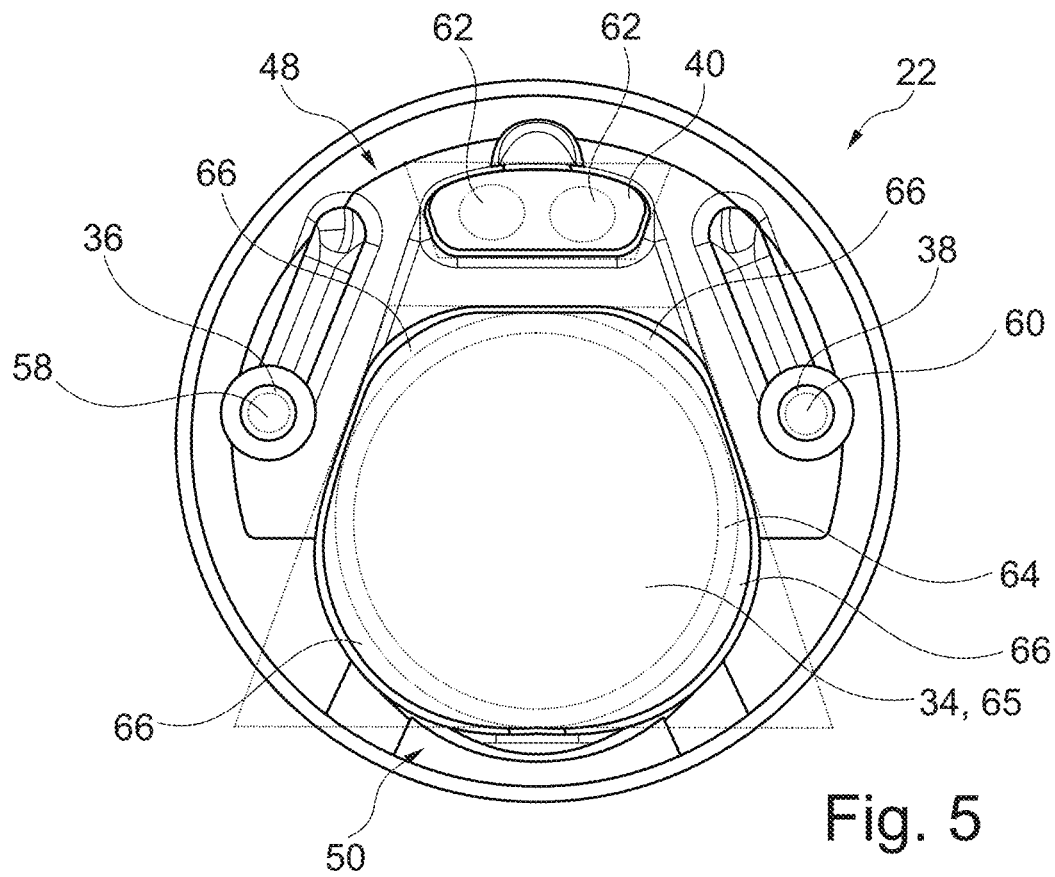
FIG. 5 is a cross-sectional view of the bending section body according to the first embodiment illustrating in particular geometrical properties of a cross-section of a working channel lumen.

The first steering wire lumen 36 and the second steering wire lumen 38 both have a cross-sectional shape in the form of a circle and are preferably adapted in size to first and second steering wire portions 58, 60 arranged in the first and second steering wire lumens 36, 38, as is in particular illustrated in FIG. 5. With reference again to FIG. 1, a rotating force may be applied to the operating unit 18 at the proximal handle 4 by a user, which is transmitted into a pulling force acting on the first and second steering wire portions 58, 60 in an axial direction of the first and second steering wire portions 58, 60, in order to bend the bending section body 22.

The electrical wire lumen 40 is also located on the first side 48 with respect to the center plane 44 in a radial outer area. The hinge plane 46 runs through the electrical wire lumen 40. The electrical wire lumen 40 is preferably formed axisymmetric with respect to the hinge plane 46. The cross-section of the electrical wire lumen 40 may be described as elongated, rounded, approximately trapezoidal shaped with rounded corners, especially preferred like an isosceles trapezium. In particular, the plotted isosceles trapezium in FIG. 5 around the outer contour of the electrical wire lumen 40 illustrates the essentially trapezoidal shape with rounded corners of the electrical wire lumen 40. As is further illustrated in FIG. 5, the electrical wire lumen 40 accommodates electrical wires or cables 62, wherein two are exemplarily shown in FIG. 5. The electrical wires or cables 62 may be cables for the camera or for light emitting diodes provided in the distal tip unit 12 of the insertion cord 6.

Since the first steering wire lumen 36, the second steering wire lumen 38 and the electrical wire lumen 40 are all located on the first side 48 with respect to the center plane 44 and are all located in radial outer areas of the bending section body 22, there is much space in a central area of the bending section body 22 and in particular on the second side 50 with respect to the center plane 44 for the working channel lumen 34. A major portion of the working channel lumen 34 thus lies on the second side 50 with respect to the center plane 44. The working channel lumen 34 may be enlarged due to the displacement of the first and second steering wire lumens 36, 38. The working channel lumen 34 preferably takes or occupies more than 30% of the cross-sectional area of the bending section body 22. It is desirable according to the present disclosure to provide a working channel lumen 34, which is as big as possible. Therefore, the available space is suitably used by providing a working channel lumen 34, which has a non-circular cross-sectional shape, wherein the non-circular cross-sectional shape has a shape, which optimally uses the available space.

As can be seen in FIG. 5, a working channel tube 64, which is an elongated bendable tubular member having a circular cross-section, is arranged inside the working channel lumen 34. In FIG. 5, the non-circular cross-section of the working channel lumen 34 preferably has a shape of a widened or bulged circle. In particular, the working channel lumen 34 has four bulge portions 66 in which the cross-section of the working channel lumen 34 is widened or extended compared to the circular working channel tube 64. The working channel lumen 34 is basically axisymmetric with respect to the hinge plane 46. The trapezoid plotted around the working channel lumen 34 in FIG. 5 further shows that the working channel lumen 34 can also be described as having a cross-sectional shape of an isosceles trapezoid with rounded corners, which are cut out such that no perfect circle is formed. The provision of the bulge portions 66 makes it possible to deform or shape the working channel tube 64 into the working channel lumen 34 even if the working channel tube 64 has an outer diameter above a nominal value. In this case, the working channel tube 64 can be pressed into the working channel lumen 34 and the flexible and elastic working channel tube 64 may fill the bulge portions 66 of the non-circular cross-section of the working channel lumen 34. In a variation of the present embodiment, the non-circular cross-section of the working channel lumen 34 is comprised at least by two bulged portions in the second part of the bending section body, which is opposite the first part, in which the steering wire lumens are located. The portion of the working channel lumen 34 in the first part of the bending section body may have an arcuate perimeter with constant radius, thus without bulges.

In total, the four lumens inside the bending section body 22, in particular the working channel lumen 34, the first steering wire lumen 36, the second steering wire lumen 38 and the electrical wire lumen, are optimized in arrangement and size according to the present disclosure, wherein in particular a size of the working channel lumen 34 is raised for a given specific small outer diameter of the bending section body, and wherein sufficient wall thicknesses, in particular wall thicknesses of at least 0.2 mm, between any of the four lumens and also with respect to an outer surface of the bending section body 22 are provided so that the bending section body 22 can be suitably manufactured in an injection molding process.

Figure 6:
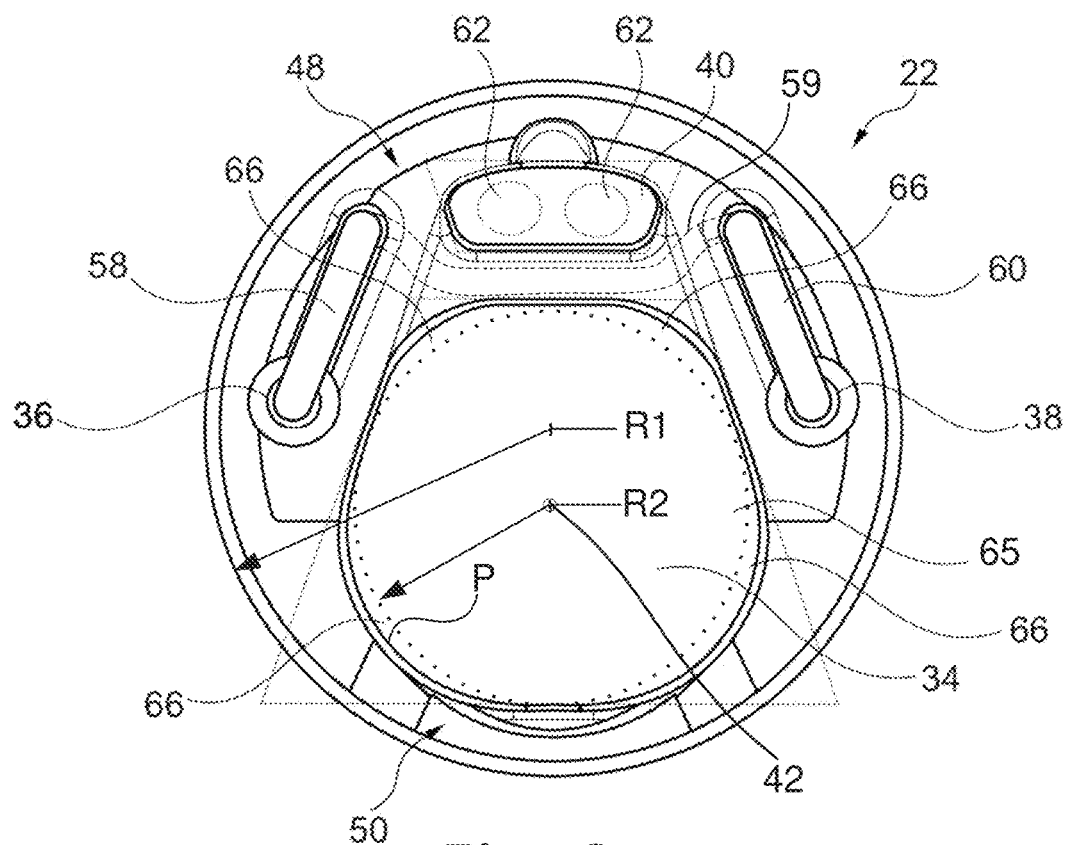
FIG. 6 is a cross-sectional view of the bending section body according to the first embodiment illustrating in particular geometrical properties of the cross-section.

FIG. 6 depicts the bending section body cross-section of the bending section of FIGS. 3 and 5, with the working channel tube 64 removed and portions of the steering wire portions 58 and 60 showing. In the present embodiment and the embodiment described with reference to FIG. 8, the steering wire portions 58 and 60 form part of a single wire. An intermediate portion 59 connects the steering wire portions 58 and 60 and is positioned behind (into the page) the wall portion between the working channel lumen 34 and the electrical wire lumen 40. Advantageously, threading the steering wire portions through the steering wire lumen 36, behind the wall portion, and then into the steering wire lumen 38 secures the steering wire without the need to individually secure the distal ends of the steering wire portions 58 and 60 when the intermediate portion is omitted and two separate steering wires are provided. Of course separate steering wires, each having proximal ends and distal ends that are not connected to each other, may also be used.

Also depicted in FIG. 6 is a circle with radius R2 representing the outer diameter of the largest cylindrical working channel tube, which has a circular cross-section, that fits within the working channel lumen 34. The radius R1 is the radius of the cross-section of the bending section body. A sleeve or cover is placed over the bending section body to fluid seal it. Thus, the radius of the bending section is slightly larger than R1. The numeral 65 represents the lumen inside the working channel tube 64, which is not shown in FIG. 5. "P" indicates the inner perimeter of the working channel lumen 34. The inner perimeter is the largest cross-section that the working channel tube 64 can have. FIG. 6 is drawn to scale. The outer diameter (2*R1) of the bending section body is 3.6 mm, the outer diameter (2*R2) of the largest circular working channel tube is 2.1 mm, and the smallest thickness of the wall between the steering wire lumen 36 (or 38) and P is 0.25 mm. The bulge portions 66 are also shown and depicted more clearly in FIG. 6.

Figure 7:
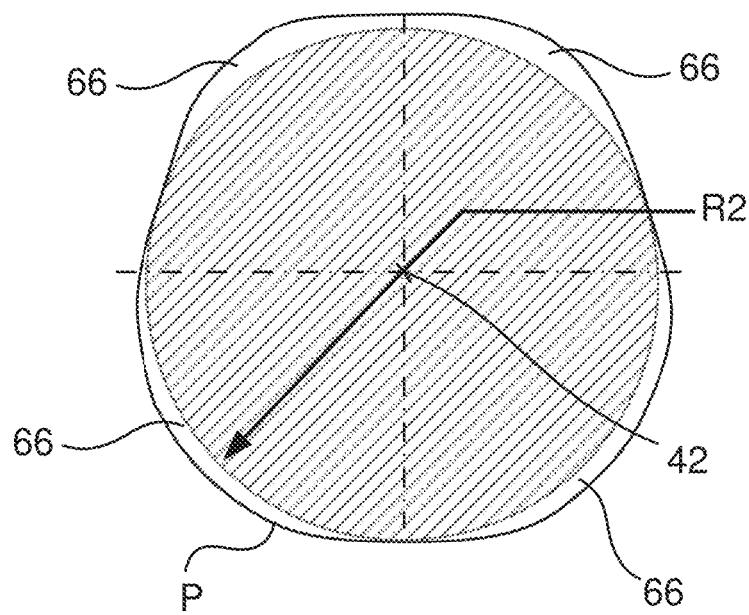
FIG. 7 is a depiction of the cross-sections of the working channel lumen according to the first embodiment and a cylindrical working channel tube.

FIG. 7 shows the perimeter P, the bulge portions 66, and the circle representing the largest cylindrical working channel tube cross-section, with radius R2. An estimation of the area of the circle and the perimeter of the working channel lumen indicates that the area enclosed by the perimeter is 28% larger than the area of the circle. This increases the ratio of the size of the working channel tube to the diameter of the bending section body. The ratio is 0.32 for the circle and 0.41 for the bulged working channel tube, a 9% improvement or increase in the ratio. This ratio increases even more as the diameter of the bending section body increases, and decreases if the diameter decreases, if the minimum thickness of the wall portions separating the passages remains constant. The smallest thickness of the wall between the steering wire lumen 36 (or 38) and P can be reduced to less than 0.25 mm to maintain the 9% improvement in the ratio. In one variation of the present embodiment, the ratio of the average outer diameter of the bending section tube to the outer diameter of the bending section body is about 0.5, preferably 0.5+/−0.1, with the outer diameter of the bending section body being about 3.0 mm, preferably 3.0+/−0.2 mm. In another variation of the present embodiment, the ratio of the average outer diameter of the bending section tube to the outer diameter of the bending section body is about 0.6, preferably 065+/−0.1, with the outer diameter of the bending section body being about 4.4 mm, preferably 4.4+/−0.2 mm. In the present context the term "about" comprises 5% of the stated value.

Inserting a large circumference working channel tube requires some care. The manufacturing tolerances might not permit insertion of a working channel tube with a diameter equal to the inner diameter of the working channel lumen due to the length to diameter ratio of the bending section body, which may be greater than 10:1, potentially greater than 15:1. One potential way to insert the working channel tube into the bending section body is to provide a mandrel with radial cavities and a central, longitudinal, cavity. The cavities are connected. Vacuum applied to one end of the longitudinal cavity draws the tube onto the surface of the mandrel, temporarily reducing its cross-sections. Portions of the tube will form small folds. When the tube is in the desired position, the vacuum is replaced with positive pressure to expand the tube. Then the mandrel is removed. Alternatively, the working channel tube is passed through a ring with a suitable diameter to create some folds in the working channel tube as it passes through the ring. Once inside the bending section body, positive pressure can be applied via the handle end of the tube, for example, to expand the working channel tube to its larger cross-section.

Figure 8:
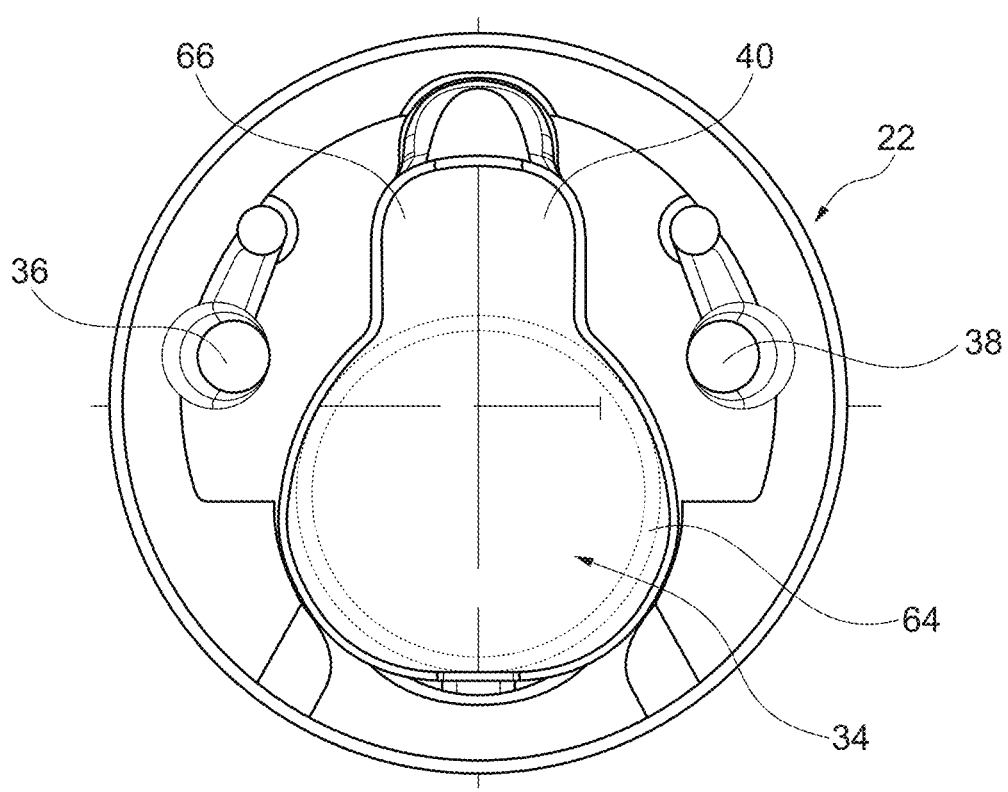
FIG. 8 is a cross-sectional view of the bending section body according to a second embodiment.

FIG. 8 shows a second embodiment. According to the first embodiment, shown in FIGS. 3 to 7, all four lumens are circumferentially closed lumens, i.e. are not connected to each other within the bending segments. In FIG. 8 the working channel lumen 34 is connected to the electrical wire lumen 40. According to this second embodiment, there is thus no wall of polymer material between the working channel lumen 34 and the electrical wire lumen 40. The electrical wire lumen 40 of the second embodiment may be considered as a rather big bulge portion 66 of the working channel lumen 34 and thus as a portion of the working channel lumen 34. It is thus not necessary, according to the present disclosure, that a separate electrical wire lumen 40 is provided. The same applies for the first and second steering wire lumens 36, 38. The cross-sectional shape of the working channel lumen 34 may be described as (light) bulb shape in the second embodiment. When the working channel tube 64 is inserted and arranged in the working channel lumen 34, the electrical wire lumen 40 is initially formed, namely partially by the polymer material of the bending section body 22, i.e. the material surrounding the upper bulge portion 66 of the working channel lumen 34, and partially by the working channel tube 64, which is already arranged in the lower portion of the working channel lumen 34 in FIG. 5.

The following items are further variations and examples of the embodiments described with reference to FIGS. 1 to 8.

1. Endoscope (2) comprising: an endoscope handle (4); and an insertion cord (6) configured to be inserted into a patient's body cavity and comprising a bendable bending section (10) having a bending section body (22) made from one or two pieces of polymer material; the bending section body (22) comprising: a plurality of bending segments (24, 26, 28); a plurality of bendable hinges (30, 32) keeping together and formed integrally with the plurality of bending segments (24, 26, 28); a working channel lumen (34) provided for accommodating a working channel tube (64), the working channel lumen (34) having a non-circular cross-section; and a first steering wire lumen (36) and a second steering wire lumen (38), the first steering wire lumen (36) being provided for accommodating a first steering wire (58) and the second steering wire lumen (38) being provided for accommodating a second steering wire (60), wherein the first steering wire lumen (36) and the second steering wire lumen (38) are displaced with respect to a center plane (44) of the bending section body (22) towards a first side (48), the center plane (44) being a plane including a center axis (42) of the bending section body (22) and dividing the bending section body (22) into the first side (48) and a second side (50).

2. Endoscope (2) according to item 1, wherein a first axis (52) of the first steering wire lumen (36) and a second axis (54) of the second steering wire lumen (38) define a steering wire passage plane (56) which is displaced from the center plane (44) and arranged on the first side (48), the center plane (44) being a plane which is parallel to the steering wire passage plane (56) and which includes the center axis (42) of the bending section body (22).

3. Endoscope (2) according to item 2, wherein the steering wire passage plane (56) is displaced from the center plane (44) by a distance (d) which is greater than or equal to 0.2 mm, preferably greater than 0.3 mm.

4. Endoscope (2) according to any one of the preceding items 1 to 3, wherein the first steering wire (58) is accommodated in the first steering wire lumen (36), the second steering wire (60) is accommodated in the second steering wire lumen (38), and the first steering wire (58) and the second steering wire (60) are displaced with respect to the center plane (44) of the bending section body (22).

5. Endoscope (2) according to any one of the preceding items 1 to 4, wherein the working channel tube (64) as an elongated bendable or flexible tubular member is accommodated in the working channel lumen (34) and a cross section of the working channel tube (64) is circular.

6. Endoscope (2) according to any one of the preceding items 1 to 5, wherein the non-circular cross-section of the working channel lumen (34) has a shape of a widened or bulged circle having a plurality of bulge portions (66), in which the cross-section is widened or extended compared to a circular cross-section.

7. Endoscope (2) according to item 6, wherein the non-circular cross-section of the working channel lumen (34) has a cross-sectional shape of an isosceles trapezoid with rounded corners, and the bulge portions (66) are provided adjacent the rounded corners.

8. Endoscope (2) according to any one of the preceding items 1 to 7, wherein a pair of hinges, namely a first hinge (30) and a second hinge (32), is provided between two adjacent bending segments (24, 26, 28), wherein the first hinge (30) is provided on the first side (48) and the second hinge (32) is provided on the second side (50), and wherein the first hinge (30) is formed stiffer than the second hinge (32).

9. Endoscope (2) according to any one of the preceding items 1 to 8, wherein a greater portion of the working channel lumen (34) lies on the second side (50) and a smaller portion of the working channel lumen (34) lies on the first side (48).

10. Endoscope (2) according to any one of the preceding items 1 to 9, wherein the bending section body (22) further comprises an electrical wire lumen (40) provided for accommodating electrical supply wires or electrical cables and arranged on the first side (48).

11. Endoscope (2) according to item 10, wherein the working channel lumen (34) and the electrical wire lumen (40) are both circumferentially closed lumens.

12. Endoscope (2) according to item 10, wherein the electrical wire lumen (40) is a bulge portion (66) of the working channel lumen (34).

13. Endoscope (2) according to any one of the preceding items 1 to 12, wherein the endoscope (2) is a two-way bending endoscope.

14. Endoscope (2) according to any one of the preceding items 1 to 13, wherein an outer diameter of the insertion cord (6) is below 6 mm, preferably below 5 mm, further preferably below 4 mm, and especially preferred below 3 mm.

15. System comprising: an endoscope (2) according to any one of the preceding items 1 to 14; and a monitor (14).

LIST OF REFERENCE SIGNS 2 endoscope
4 endoscope handle
6 insertion cord
8 insertion tube
10 bending section
12 distal tip unit
14 monitor
16 cable
18 operating unit
20 working channel access port
22 bending section body
24 proximal end segment
26 intermediate segment
28 distal end segment
30 first hinge
32 second hinge
34 working channel lumen
36 first steering wire lumen
38 second steering wire lumen
40 electrical wire lumen
42 center axis
44 center plane
46 hinge plane
48 first side
50 second side
52 first axis
54 second axis
56 steering wire passage plane 58 first steering wire portion
60 second steering wire portion
62 electrical wire/cable
64 working channel tube
65 working channel tube lumen
66 bulge portion

The invention claimed is:

1. An endoscope comprising:
a handle;
an insertion cord extending from the handle, the insertion cord comprising an insertion tube and a bending section having a bending section body; and
a working channel tube;
a first steering wire portion;
a second steering wire portion;
the bending section body comprising segments and hinges keeping together, and formed integrally with, the segments, the bending section body having a center axis and a center plane traversing the center axis, the center plane dividing the bending section into a first bending section side and a second bending section side, and the segments comprising:
 passages that together form a working channel lumen, the working channel lumen having a non-circular cross-section and the working channel tube positioned, at least in part, in the working channel lumen;
 first steering wire lumens configured to accommodate the first steering wire portion, the first steering wire lumens displaced with respect to the center plane towards the first side; and
 second steering wire lumens configured to accommodate the second steering wire portion, the second steering wire lumens displaced with respect to the center plane towards the first side,
 wherein the first steering wire lumens are aligned along a first axis and the second steering wire lumens are aligned along a second axis, a steering wire passage plane traversing the first axis and the second axis, the steering wire passage plane being parallel to and displaced from the center plane, and
 wherein the steering wire passage plane is displaced from the center plane by a distance (d) which is greater than or equal to 0.2 mm.

2. The endoscope of claim 1, wherein an average diameter of the bending section body is in the range of 2.5 mm to 6.0 mm, and wherein the distance (d) is greater than or equal to 6% of the average diameter.

3. The endoscope of claim 1, wherein the distance (d) is greater than or equal to 0.3 mm.

4. The endoscope of claim 1, wherein the bending section body comprises a circular cross-section, and wherein the average diameter is the diameter of the circular cross-section.

5. The endoscope of claim 1, wherein a first hinge of the hinges and a second hinge of the hinges connect two of the segments, wherein the first hinge is provided on the first side and the second hinge is provided on the second side.

6. The endoscope of claim 1, wherein a cross-section of the working channel tube, prior to assembly, is circular.

7. The endoscope of claim 1, wherein the non-circular cross-section of the working channel lumen has a shape of a widened or bulged circle having at least two bulge portions in which the cross-section of the working channel lumen is widened or extended compared to a circular cross-section.

8. The endoscope of claim 1, wherein the working channel lumen includes a first portion and a second portion, the first portion lies in the first side, the second portion lies in the second side, and the second portion is larger than the first portion.

9. The endoscope of claim 1, wherein the bending section body further comprises an electrical wire lumen arranged on the first side and provided for accommodating electrical wires or electrical cables.

10. The endoscope of claim 9, wherein the working channel lumen and the electrical wire lumen are both circumferentially closed.

11. The endoscope of claim 9, wherein the electrical wire lumen is a bulge portion of the working channel lumen.

12. The endoscope of claim 1, wherein the bending section body is made from one or two pieces, the one or two pieces made of polymer material.

13. The endoscope of claim 1, wherein an average diameter of the bending section body is less than 6.0 mm.

14. The endoscope of claim 13, wherein the average diameter of the bending section body is less than 3.1 mm.

15. A system comprising:
the endoscope according to claim 1, and a monitor.

16. An endoscope comprising:
a handle;
an insertion cord extending from the handle, the insertion cord comprising an insertion tube and a bending section having a bending section body; and
a working channel tube;
a first steering wire portion;
a second steering wire portion;
the bending section body comprising segments and hinges keeping together, and formed integrally with, the segments, the bending section body having a center axis and a center plane traversing the center axis, the center plane dividing the bending section into a first bending section side and a second bending section side, and the segments comprising:
 passages that together form a working channel lumen, the working channel lumen having a non-circular cross-section and the working channel tube positioned, at least in part, in the working channel lumen;
 first steering wire lumens configured to accommodate the first steering wire portion, the first steering wire lumens displaced with respect to the center plane towards the first side; and
 second steering wire lumens configured to accommodate the second steering wire portion, the second steering wire lumens displaced with respect to the center plane towards the first side,
 wherein a first hinge of the hinges and a second hinge of the hinges connect two of the segments, wherein the first hinge is provided on the first side and the second hinge is provided on the second side, and
 wherein the first hinge is stiffer than the second hinge.

17. An endoscope comprising:
a handle;
an insertion cord extending from the handle, the insertion cord comprising an insertion tube and a bending section having a bending section body; and
a working channel tube;
a first steering wire portion;
a second steering wire portion;
the bending section body comprising segments and hinges keeping together, and formed integrally with, the segments, the bending section body having a center axis and a center plane traversing the center axis, the center plane dividing the bending section into a first bending section side and a second bending section side, and the segments comprising:

passages that together form a working channel lumen, the working channel lumen having a non-circular cross-section and the working channel tube positioned, at least in part, in the working channel lumen;

first steering wire lumens configured to accommodate the first steering wire portion, the first steering wire lumens displaced with respect to the center plane towards the first side; and second steering wire lumens configured to accommodate the second steering wire portion, the second steering wire lumens displaced with respect to the center plane towards the first side, wherein the non-circular cross-section of the working channel lumen has a shape of a widened or bulged circle having at least two bulge portions in which the cross-section of the working channel lumen is widened or extended compared to a circular cross-section, and wherein the non-circular cross-section of the working channel lumen has a cross-sectional shape of an isosceles trapezoid with rounded corners, and wherein the bulge portions are adjacent the rounded corners.

18. A visualization system comprising:
an endoscope comprising:
  a handle;
  an insertion cord extending from the handle, the insertion cord comprising an insertion tube and a bending section having a bending section body, the bending section body having a diameter in the range of 2.5 mm to 3.5 mm; and
  a working channel tube;
  a first steering wire portion;
  a second steering wire portion;
  the bending section body comprising segments and hinges keeping together, and formed integrally with, the segments, the bending section body having a center axis and a center plane traversing the center axis, the center plane dividing the bending section into a first bending section side and a second bending section side, and the segments comprising:
    passages that together form a working channel lumen, the working channel lumen having a non-circular cross-section and the working channel tube positioned, at least in part, in the working channel lumen;
    first steering wire lumens configured to accommodate the first steering wire portion, the first steering wire lumens displaced with respect to the center plane towards the first side by a distance (d) which is greater than or equal to 8% of the diameter; and
    second steering wire lumens configured to accommodate the second steering wire portion, the second steering wire lumens displaced with respect to the center plane towards the first side by the distance (d).

19. The system of claim 18, further comprising a monitor.

* * * * *